March 10, 1936.  C. E. McCORMICK  2,033,436
WEATHER STRIP
Original Filed March 30, 1932    2 Sheets-Sheet 2
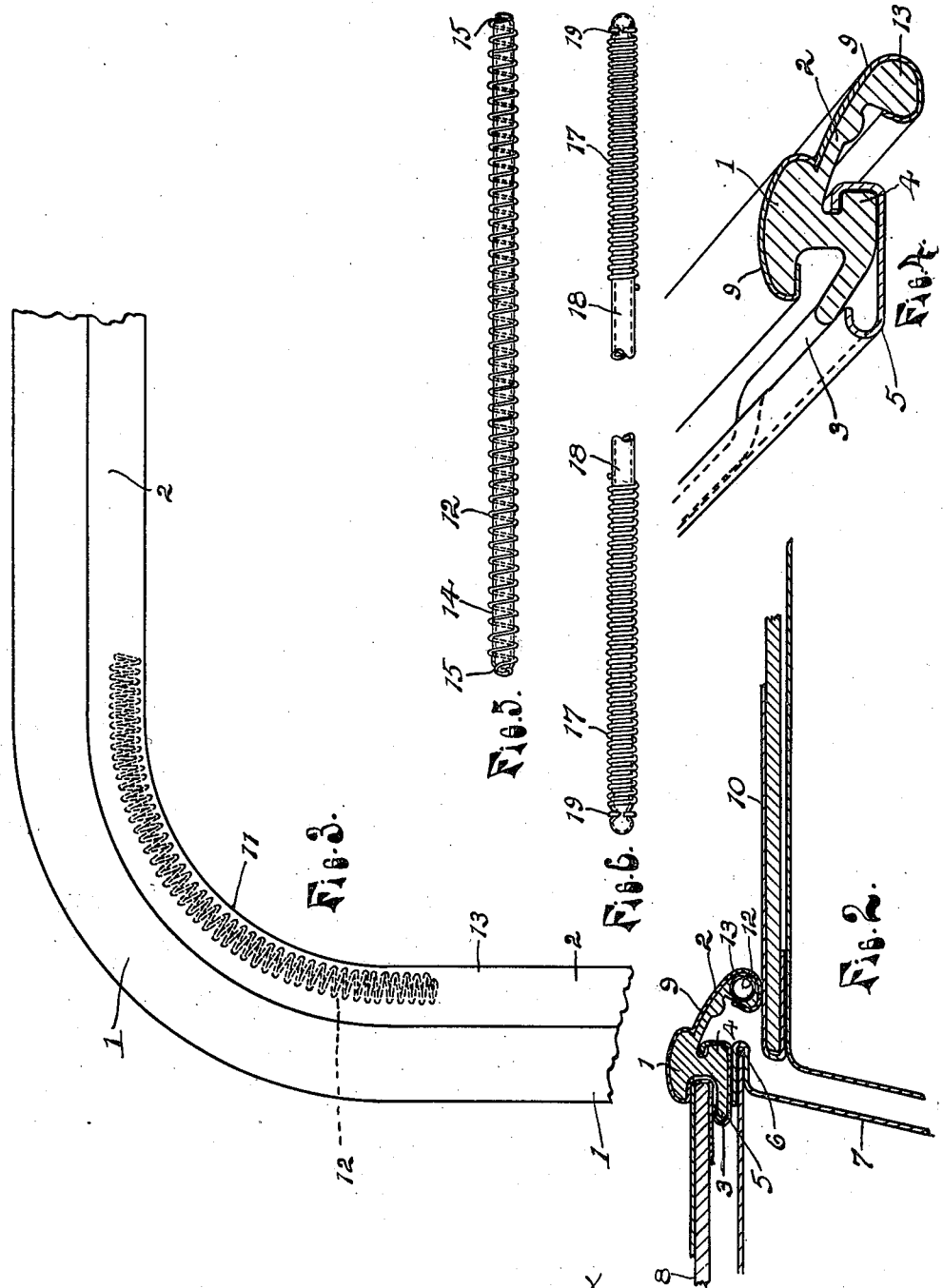

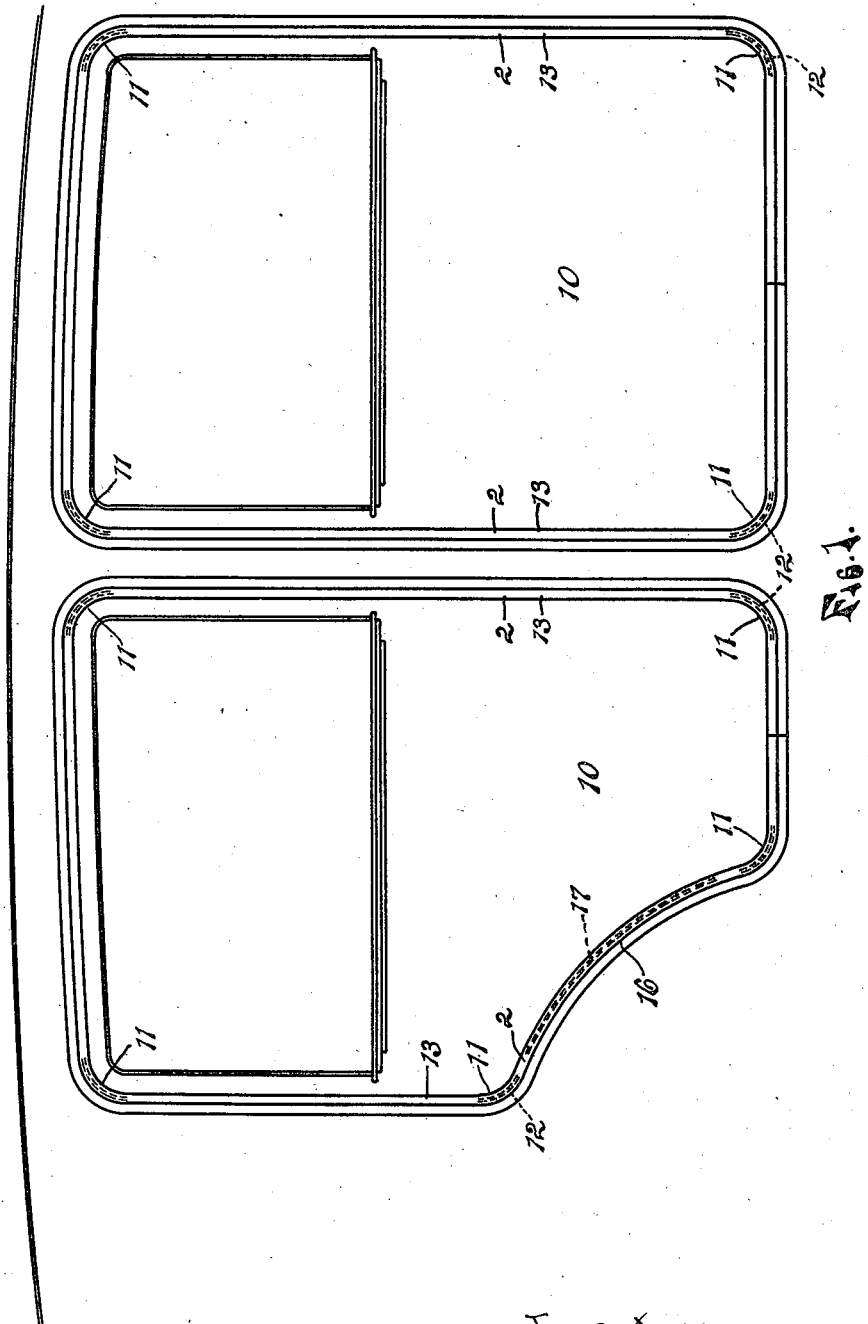

Patented Mar. 10, 1936

2,033,436

UNITED STATES PATENT OFFICE 2,033,436

WEATHER STRIP

Charles E. McCormick, Dearborn, Mich.

Application March 30, 1932, Serial No. 602,002
Renewed August 7, 1935

19 Claims. (Cl. 20—69)

This invention relates to an edging strip preferably formed of plastic material molded or otherwise shaped into desired form, and more particularly to a strip of this character made in a straight length but adapted to be bent and secured along the curved edge of a structure without undue distortion, said strip embodying a yieldable metal member embodied therein and having an inherent tendency to change its overall length, said strip also including holding means for said yieldable member to prevent said member from changing in length, the construction being such that when said strip containing such member and holding means is formed, said strip will remain in straight condition until said yieldable member is released by said holding means, upon which release said yieldable member will exert a force upon said strip in the direction of the length thereof, which force will tend to either stretch or contract a portion of said strip and cause the same to follow, without undue distortion, the curvature of a device to which the strip is applied.

While the strip as illustrated in the accompanying drawings is particularly designed to serve as a weather strip for the doors of automobiles, it will be understood that the invention may be embodied in strips for many other purposes, the drawings being merely illustrative of one embodiment and use of the present invention as applied to the door openings of an automobile body;

Figure 1 being a diagrammatic section through a portion of an automobile body, showing a part of one side of the body with door openings therein and doors in inside elevation, closing said openings;

Fig. 2 is a sectional detail of door framing, door and a weather strip illustrative of the invention applied thereto, and all in horizontal section;

Fig. 3 is a detail showing a portion of the weather strip in elevation and as applied along the curved edge portion of a door opening;

Fig. 4 is an enlarged sectional perspective detail of the weather strip and its attaching channel;

Fig. 5 is a detail showing a contraction spring as applied to and held by a tube, ready for insertion in a mold in which the weather strip is to be molded; and Fig. 6 is a detail similar to Figure 5, showing an expansion spring sleeved upon its holding tube, and tube and spring broken away intermediate its ends to shorten the figure.

As clearly shown in Figure 4, the weatherstrip comprises a body portion 1 formed with a laterally extending flexible flange 2 extending laterally from one side of the body, and an attaching flange 3 extending laterally from the body in an opposite direction. The body 1 is formed with a lateral rib 4 beneath the flange 2 extending in a direction opposite to that of the flange 3 and this flange and rib are adapted to seat within a metal holding channel 5 which is adapted to be secured in any suitable manner along the edge flange of the door frame 7 in the automobile body which is provided with the usual inside panelling 8. The inner or exposed surfaces of the body 1 and flexible flange 2 of the weatherstrip are covered by a strip of fabric 9 to make an inside surface finish for the weatherstrip, this fabric being cemented smooth upon said surfaces and one edge portion of said fabric is carried over the projecting edge of the body above and spaced from the securing flange 3.

When the weatherstrip is applied to the body, the channel member 5 is first secured along the edge of the door opening and then the strip is applied by forcing the flange 3 into said channel as illustrated in Figure 4, where it will be held by springing into said channel, the edge of the panel 8 being engaged within the groove of the body 1 between the overhanging edge of the head or end of the body and the securing flange 3. The securing of the weatherstrip in place by forcing it by any suitable tool (not shown) into the channel 5, therefore also holds the edge of the panels 8 all around the door opening, by the engaging of the panel within the groove of the strip.

The flange 2 of the weatherstrip when in place, extends inwardly of the door opening into contact with the inner surface of the door 10 when closed, and at a short distance from its edge, and as this flange is easily bendable, it will engage the door closely, lying firmly thereagainst and making a tight joint therewith.

The corners of the doors 10 and therefore the corners of the door framing, are frequently curved. Now, if the weatherstrip be applied along these door openings with the flange 2 extending inwardly of the opening, when such strip is secured along the curved corners as at 11, this flange would naturally bend laterally out of alignment with those portions extending along the straight portions of the opening, due to the reduction in radius of the inside edge portion of the flange in passing around the curved corner, and in order to hold this flange against such undue lateral buckling or deflection along each corner curve, a coiled spring 12 is molded into the bead 13 on the free edge of said flange 2 along that portion of the weatherstrip which is to extend along each corner of the door opening, said spring being sleeved upon a glass tube 14 with the spring drawn out or expanded and secured at its ends to the ends of the tube as at 15, in any suitable manner.

This tube 14 and spring 12 thereon are laid into the mold so that they will be molded into the bead 13 during the molding of the weatherstrip from rubber or other suitable plastic composition within a suitable straight mold or other forming device, said spring and tube being placed in the proper place in the mold so that they will come at the corner of the door opening and extend throughout the curved portion of said corner, the mold being long enough to form a strip of sufficient length to reach all the way round the door opening, and a tube and spring being placed in the mold at each of those portions of the strip which will come opposite each curved portion of the door opening.

The glass tube 12 holds the spring in expanded condition and after tube and spring have been properly molded within the edge bead 13 with the weathership formed straight, said strip is removed from the mold, the fabric 9 is cemented in place and the strip then applied to the channel member 5 around the door opening. When the workman reaches the curved corner of the door opening in applying the strip, he will crush the glass tube with that portion of the bead and the spring will at once contract and consequently contract that portion of the free edge or bead of the flange in which the spring is embedded. This contracting of this short length of spring at the corner of the door opening, will tend to shorten or contract said flange edge along the radius of the corner and thus eliminate wrinkles or distortions in said flange which would otherwise occur due to the difference in radius between the inner edge of the flange and the body 1 along this radius.

From the view point of practical and economical manufacture, it is very desirable that this weatherstrip be formed straight, either in a straight mold or by extruding in a continuous length, for it is essential that the weatherstrip be straight when the fabric covering 9 is applied thereto, since this fabric for economy, must be cut in long straight lengths. It is therefore of considerable advantage to have the strip come out of the mold straight and remain straight until applied to the automobile body. The glass tubes serve to hold the strip straight until it is applied, but in applying it, this tube may be easily crushed and then the spring will act to exert a force on the strip flange in the direction of its length, and as the spring is located laterally of the strip within said flange, such force will curve the strip laterally to conform it substantially to the curvature of the corner of the door opening to which it is to be applied. This spring thus tends to contract the flange, eliminating all tendency of the strip flange to buckle or spring laterally, due to the curving or bending of the strip and flange around the corner of the door opening, where said flange extends inwardly or toward the axis of the curve.

Where the flange 2 extends outwardly away from the axis of the curve, as at 16, Figure 1, where the rear door of the body is cut away or curved upwardly and rearwardly over the rear vehicle wheels, it may be found desirable to mold a coiled spring 17 within this portion of the weatherstrip, said spring being sleeved upon a glass tube 18 and held under compression by attaching its ends to the ends of the tube in any suitable manner, as at 19. By placing this tube and spring within that portion of the mold in which that part of the strip is formed which is to extend along the curved portion 16 of the door opening with its flange 2 extending outward from the axis of said curve, said spring is molded within that portion of the bead 13 of the flange 2 extending along the curve 16 of the door opening, and when this tube is crushed in securing the strip in place, said spring will expand in length and stretch the edge of the flange to take care of the difference in radius between the free edge of the flange and the body 1 of the strip. This will prevent distortion of said flange along the inwardly curved portions of the door framing, and by properly locating the long tube 18 and spring 17 in the mold relative to the several short tubes 14 and springs 12, the several springs are properly located in the weatherstrip to bring each along the desired curved portion of the door framing.

With this arrangement, the weatherstrip may be very conveniently molded or formed by an extruding process, the term molded as herein employed, applying to both molding and extruding, with springs therein, either under expansion or contraction, and these springs so held that the weatherstrip will remain straight until such time as the strip is secured in operative position, when the springs may be released without interfering with the operation of securing the strip in place or its free operation after being so released.

Obviously some holding means for the several springs, other than glass tubes, may be substituted therefor and such other means is contemplated, but such tubes, being sufficiently strong lengthwise, will hold the springs against expansion or contraction, and, due to their cylindrical form, are sufficiently strong transversely to resist mold pressures. They are, nevertheless weak as to bending strains as their walls are thin, and they can, therefore be readily broken and disintegrated to freely release the springs when desired. Further, these tubes are not affected by heat within the mold.

Other changes in the particular construction of weatherstrip and arrangement of parts, may be made within the scope of the appended claims, and the invention may be applied to other forms of edging strips, such as upholstery welts and trimmings, without departing from the spirit of the invention, and I do not, therefore, limit myself to the particular application shown.

Having thus fully described my invention, what I claim is:

1. A flexible edging strip, a yieldable member within said edging strip, and holding means within said strip for holding said yieldable member in condition to exert a force upon said edging strip in the direction of its length when said holding means is released.

2. An edging strip of the character described having a laterally extending flange, a spring in said flange to exert a force in the direction of the length of said flange, and means for holding and releasing said spring.

3. In an edging strip of the character described adapted to be formed in a mold, a spring, and means embedded in said strip to hold and to release said spring to permit said spring to exert a force on said strip longitudinally thereof.

4. In a flexible member of the character described, a resilient member in said flexible member extending longitudinally thereof to exert a force thereon longitudinally of said member, and a fragile rigid holding member for said spring within said flexible member.

5. A flexible strip of the character described including a body, a flexible flange extending laterally from said body, a coiled spring embedded in the free edge portion of said flange longitudinally thereof, and means for holding said spring against exerting a force longitudinally of said flange and for releasing the same to exert such force.

6. A flexible strip of the character described, a coiled spring embedded in said strip longitudinally thereof, and a member upon which said spring is sleeved and held within said strip with said spring held against exerting force longitudinally of said strip, said member being adapted to release said spring and permit it to exert a force upon said strip longitudinally thereof.

7. A flexible weatherstrip comprising a body portion and a flange extending laterally from said body portion, a member embedded within said flange, and a coiled spring sleeved upon said member and secured at its ends thereto with said spring held by said member in condition to exert a force longitudinally of said flange, said member being adapted to release said spring and permit the same to exert such force.

8. A flexible weatherstrip comprising a body formed with a closure engaging flange extending laterally from one side thereof, a flexible flange extending laterally from the opposite side thereof and a rib beneath said first named flange, of a channel member into which said body, rib and last named flange are adapted to be inserted by a deflection of said flange, said channel having side portions to engage over the edges of said flange and rib to hold said weatherstrip in place upon the device to which it is applied.

9. A flexible weatherstrip for automobile body doors comprising a body, a flange extending laterally from one side of said body, a second flange extending laterally from the opposite side of said body, and a rib on said body beneath said first named flange, said first named flange being formed with an edge bead, a channel member into which said body, second named flange and rib are adapted to be seated by a bending of said flange, a glass tube molded into said bead, and a coiled spring sleeved upon said tube and secured at its ends thereto with said spring held thereby against exerting force upon said flange longitudinally thereof.

10. A molding strip comprising as an assembled unit a metallic supporting strip and a flexible rubber strip having an edge secured to said strip and also having a laterally projecting free edge portion forming a yieldable sealing member, and a spring secured in the length of said edge portion and adapted to exert thereon a longitudinal contracting force effective to contract said edge portion when the rubber strip is bent in its plane around a curve.

11. A molding strip comprising a metal channel strip adapted to be secured to the frame of a vehicle body along the free edge of an interior trim panel, a rubber member having a flanged base confined in the channel of said strip and having a longitudinal free edge at one side overlying said strip to form a channel adapted to confine said edge of the trim panel.

12. A molding strip comprising a metal channel strip adapted to be secured to the frame of a vehicle body along the free edge of an interior trim panel, a rubber member having a flanged base confined in the channel of said metal strip and having a longitudinal free edge at one side overlying said metal strip to form a channel adapted to confine said edge of the trim panel, said rubber member also having a longitudinal flexible free edge at its opposite side adapted to form a sealing member.

13. A molding or finishing strip comprising a metal retaining member having a longitudinal channel, a rubber member having an enlarged edge interlocked in said channel and having at one lateral side a projecting flange forming a sealing portion, said strip being formed at its opposite lateral side with a channel adapted to receive an edge of a trim panel.

14. A molding strip comprising as a readily assembled unit an integrally formed flexible rubber member and a metal channel member for attaching the strip to a vehicle body, said strip having at one lateral side a channel adapted to receive the edge of a trim panel, said rubber member having a flange projecting laterally from the opposite side, said flange terminating in an enlarged sealing bead and being formed with a thickened portion inwardly of the bead.

15. In a vehicle body having framing forming an opening, a metal retainer strip adapted to be secured to the framing and adapted to extend angularly around a corner of the opening along an edge thereof, said strip having an upstanding flange forming a rim at its side adjacent said opening, and a flexible rubber molding having a base abutting against the inside of said rim and held thereby in stretched condition when bent angularly around said corner of the opening, said molding having a flexible edge portion extending laterally from the rim into said opening.

16. In a vehicle body having framing forming an opening, a metal retainer strip adapted to be secured to the framing and to extend angularly around a corner of the opening along an edge thereof, said strip having an upstanding flange forming a rim at its side adjacent said opening, a flexible rubber molding having a base abutting against the inside of said rim and held thereby in stretched condition when bent angularly around said corner of the opening, said molding having a flexible edge portion extending laterally from the rim into said opening, and means for contracting said edge portion in a longitudinal direction at the locality of said bend.

17. A molding comprising a metal retainer strip having a bend in its length to extend in a single plane around the corner of an opening, a flexible rubber weather strip having one edge fastened to said retainer strip, said strips having cooperating abutments along the inner margin of the bend in the metal strip effective to hold the rubber strip in stretched condition when bent around said corner of the opening, said rubber strip being formed with a laterally projecting flexible sealing portion adapted to overlie a closure for said opening.

18. A molding comprising a metal strip having longitudinal upstanding flanges, a rubber molding strip comprising a base insertable between said flanges and a flexible edge portion terminating in a sealing bead, said edge portion projecting laterally from said base across the edge of one of the flanges in a lateral direction approximately at right angles to said flanges.

19. A molding comprising a metal strip having longitudinal upstanding flanges, a rubber molding strip comprising a base insertable between said flanges and a flexible edge portion projecting laterally across an edge of one of the flanges and terminating in a sealing bead, the flange proximate to said edge portion being of greater height than the other flange.

CHARLES E. McCORMICK.